United States Patent Office.

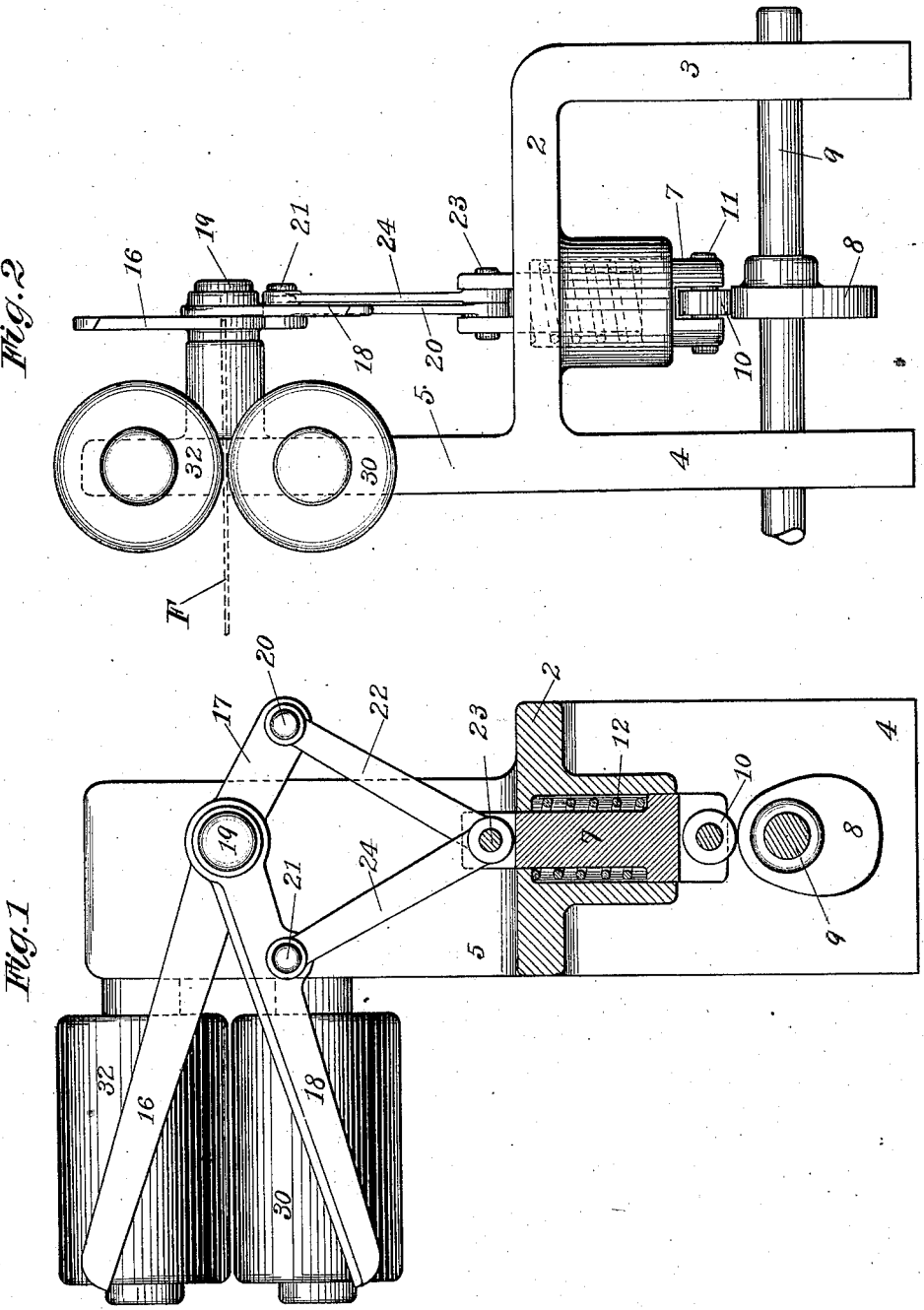

FRANCIS H. RICHARDS, OF SPRINGFIELD, MASSACHUSETTS, ASSIGNOR OF ONE-HALF TO THE PRATT & WHITNEY COMPANY, OF HARTFORD, CONNECTICUT.

SHEARING MECHANISM.

SPECIFICATION forming part of Letters Patent No. 366,187, dated July 5, 1887.

Application filed November 15, 1886. Serial No. 218,870. (No model.)

*To all whom it may concern:*

Be it known that I, FRANCIS H. RICHARDS, a citizen of the United States, residing at Springfield, in the county of Hampden and State of Massachusetts, have invented certain new and useful Improvements in Shearing Mechanism, of which the following is a specification.

This invention relates to mechanism for cutting strips of sheet materials—as, for instance, cutting off the envelope-bands in envelope-machines—the object being to furnish a simple and efficient shearing apparatus in which two shear-blades shall be similarly but oppositely operated from one actuating device.

To this end the invention consists in the combinations hereinafter described and claimed.

In the drawings accompanying and forming a part of this specification, Figure 1 is an end elevation, partially in section, of a shearing mechanism embodying my improvements. Fig. 2 is a front elevation of the same drawn in projection with Fig. 1.

Similar characters designate like parts in both the figures.

The frame-work carrying the several operative parts may be constructed in any suitable manner, or it may constitute, also, the frame of some other machine, to which this apparatus is attached. As shown in the drawings, same frame work comprises the table 2, uprights 3 and 4, and the post 5. The table has a bearing for a slide, 7, which is operated by a cam, (or, it may be, by an eccentric,) 8, on shaft 9. In practice the cam acts on a roller, 10, turning on a pin, 11, fixed in said slide, this being moved down by a suitable spring, as 12, acting between the slide and some part of the frame. The roller may, however, be omitted, the slide resting directly on the cam; also, the spring may be omitted and the cam constructed to move the slide in both directions in a well-known manner. The cam-shaft 9 is supposed to be revolved as may be required by means of a pulley or some other mechanical device not shown. The two similar shear-blades 16 18 are pivotally supported on a stud, 19, fixed in post 5. Blade 16 has an arm, 17, extending beyond said stud to carry the pin 20, the opposite pin, 21, being fixed in blade 18. These two pins 20 21 are respectively connected to the slide by oppositely-disposed rods or connections, whereby any movement of said slide operates the blades in opposite directions. These rods, designated by 22 and 24, are preferably arranged as shown, being connected, respectively, to the aforesaid pins 20 21 and both to the pin 23 in the slide. By this arrangement a downward movement of the slide opens the blades, and vice versa.

The material to be cut F, Fig. 2, is (or may be) fed to the shears by feed-rolls, as 30 32, carried on studs fixed in post 5 and suitably operated by devices not shown.

This shearing mechanism is in the nature of an improvement on the similar apparatus embodied in the mechanism shown and described in my application No. 191,885, filed February 13, 1886.

It should be understood that my improved shearing mechanism, and especially the details thereof, are capable of modification in various ways and degrees, after the manner of machines in general, without departing from my invention.

Having thus described my invention, I claim—

1. The combination, in a shearing mechanism, of a pair of blades pivotally supported, a suitably-actuated slide, and oppositely-disposed connections from said slide to said blades, substantially as set forth.

2. The combination of blade 16, having pin 20, blade 18, having pin 21, slide 7, rod 22, connected to said slide and to pin 20, and rod 24, connected to said slide and pin 21, all substantially as set forth.

FRANCIS H. RICHARDS.

Witnesses:
   GEO. W. DRAKE,
   WILBUR M. STONE.